United States Patent
Ginsberg et al.

(10) Patent No.: US 10,647,543 B2
(45) Date of Patent: May 12, 2020

(54) MULTI-CAR ELEVATOR CONTROL

(71) Applicant: Otis Elevator Company, Farmington, CT (US)

(72) Inventors: David Ginsberg, Granby, CT (US); Dang V. Nguyen, South Windsor, CT (US); Shashank Krishnamurthy, Glastonbury, CT (US)

(73) Assignee: OTIS ELEVATOR COMPANY, Farmington, CT (US)

( * ) Notice: Subject to any disclaimer, the term of this patent is extended or adjusted under 35 U.S.C. 154(b) by 459 days.

(21) Appl. No.: 15/547,838

(22) PCT Filed: Feb. 4, 2016

(86) PCT No.: PCT/US2016/016528
§ 371 (c)(1),
(2) Date: Aug. 1, 2017

(87) PCT Pub. No.: WO2016/126919
PCT Pub. Date: Aug. 11, 2016

(65) Prior Publication Data
US 2018/0016115 A1  Jan. 18, 2018

Related U.S. Application Data

(60) Provisional application No. 62/112,246, filed on Feb. 5, 2015.

(51) Int. Cl.
*B66B 1/30* (2006.01)
*B66B 11/04* (2006.01)
(Continued)

(52) U.S. Cl.
CPC ............ *B66B 1/30* (2013.01); *B60L 13/03* (2013.01); *B66B 1/3446* (2013.01);
(Continued)

(58) Field of Classification Search
CPC ....... B66B 1/30; B66B 1/3446; B66B 5/0018; B66B 9/00; B66B 11/0407; B66B 9/003
(Continued)

(56) References Cited

U.S. PATENT DOCUMENTS 3,743,055 A * 7/1973 Hoelscher ................. B66B 1/30
                                                         187/293
8,074,578 B2 * 12/2011 Thornton ................. B60L 13/03
                                                         104/281

(Continued)

FOREIGN PATENT DOCUMENTS

CN      102185559      9/2011
CN      102474217 A    5/2012

(Continued)

OTHER PUBLICATIONS

"Comparison of Linear Synchronous and Induction Motors," Retrieved from the Internet: URL:http://ntl.bts.gov/lib/24000/24600/24692/fta-dc-26-7002-2004-01.pdf [retrieved on May 20, 2016], 28 pages.

(Continued)

Primary Examiner — David S Warren
(74) Attorney, Agent, or Firm — Cantor Colburn LLP

(57) ABSTRACT

An elevator system with an elevator car 14, a linear propulsion system to impart force to the elevator car in a hoistway 11, a hoistway communication network 106, 206, a local communication network 110, 210, 310 and motion controls. One of the motion controls proximate to the elevator car is designated as a primary control 61 operable to command at least one drive 42A-42F via the local communication network. The at least one drive is coupled to one or more motor segments 22 of the linear propulsion system. The elevator system further includes a controller 46 operable to command the primary control via the hoistway communication network to reposition the elevator car within the hoistway. The (Continued)

designation of the primary control transitions between the motion controls as the elevator car moves in the hoistway.

20 Claims, 6 Drawing Sheets

(51) Int. Cl.
  *B60L 13/03* (2006.01)
  *B66B 1/34* (2006.01)
  *B66B 5/00* (2006.01)
  *B66B 9/00* (2006.01)
(52) U.S. Cl.
  CPC .............. *B66B 5/0018* (2013.01); *B66B 9/00* (2013.01); *B66B 11/0407* (2013.01); *B66B 9/003* (2013.01); *Y02T 90/16* (2013.01)
(58) Field of Classification Search
  USPC ........................................................ 187/247
  See application file for complete search history.

(56) References Cited

U.S. PATENT DOCUMENTS

| | | | | |
|---|---|---|---|---|
| 8,145,744 | B2* | 3/2012 | Gielis | B66B 13/143 |
| | | | | 187/247 |
| 9,840,395 | B2* | 12/2017 | Roberts | H02K 41/031 |
| 2003/0116384 | A1* | 6/2003 | Friedli | B66B 1/18 |
| | | | | 187/380 |
| 2006/0260880 | A1* | 11/2006 | Amano | B66B 5/0018 |
| | | | | 187/391 |
| 2007/0045051 | A1* | 3/2007 | Gerstenkorn | B66B 1/468 |
| | | | | 187/380 |
| 2008/0006172 | A1* | 1/2008 | Thornton | B60L 13/03 |
| | | | | 104/292 |
| 2009/0026846 | A1 | 1/2009 | Jacobs | |
| 2010/0185320 | A1 | 7/2010 | Nemeth-Csoka et al. | |
| 2011/0302466 | A1* | 12/2011 | Ikawa | B66B 1/34 |
| | | | | 714/704 |
| 2016/0311656 | A1* | 10/2016 | Rodriguez | B66B 1/30 |
| 2017/0036887 | A1* | 2/2017 | Roberts | H02K 41/031 |
| 2018/0016115 | A1* | 1/2018 | Ginsberg | B60L 13/03 |
| 2018/0179021 | A1* | 6/2018 | Uchida | B66B 1/3461 |

FOREIGN PATENT DOCUMENTS

| | | |
|---|---|---|
| CN | 103420260 A | 12/2013 |
| CN | 104936881 A | 9/2015 |
| JP | H09151048 A | 6/1997 |
| JP | H09272677 A | 10/1997 |

OTHER PUBLICATIONS

International Application No. PCT/US2016/016528 International Search Report and Written Opinion, dated Jun. 2, 2016, 14 pages.
T. Morizane, et al., "Direct Linear Drives for Vertical Transportation," European Conference on Power Electronics and Applications, vol. 3, Sep. 19, 1995, 6 pages.

* cited by examiner

MULTI-CAR ELEVATOR CONTROL

FIELD OF INVENTION

The subject matter disclosed herein relates generally to the field of elevators, and more particularly to multi-car elevator control in an elevator system.

BACKGROUND

Self-propelled elevator systems, also referred to as ropeless elevator systems, are useful in certain applications (e.g., high rise buildings) where the mass of the ropes for a roped system is prohibitive and there is a desire for multiple elevator cars to travel in a single lane. There exist self-propelled elevator systems in which a first lane is designated for upward traveling elevator cars and a second lane is designated for downward traveling elevator cars under normal operating conditions. A transfer station at each end of the hoistway is used to move cars horizontally between the first lane and second lane. Additional lanes can also be supported.

One type of elevator propulsion system for ropeless elevator systems includes a linear motor, such as an electrically-controlled linear synchronous motor that propels elevator cars between linear motor segments. Smooth motion control requires coordination between multiple drive elements of the linear motor segments. Maximum elevator car velocity may be limited by the speed at which commands can be issued and processed while elevator cars are in motion.

BRIEF DESCRIPTION OF THE INVENTION

According to one embodiment of the invention, an elevator system includes an elevator car and a linear propulsion system to impart force to the elevator car in a hoistway. The elevator system also includes a hoistway communication network, a local communication network, and a plurality of motion controls. One of the motion controls proximate to the elevator car is designated as a primary control operable to command at least one drive via the local communication network. The at least one drive is coupled to one or more motor segments of the linear propulsion system. The elevator system further includes a controller operable to command the primary control via the hoistway communication network to reposition the elevator car within the hoistway. The designation of the primary control transitions between the motion controls as the elevator car moves in the hoistway.

According to another embodiment of the invention, a method includes designating one of a plurality of motion controls proximate to an elevator car as a primary control operable to command at least one drive via a local communication network, where the at least one drive is coupled to one or more motor segments of a linear propulsion system operable to impart force to an elevator car in a hoistway. A command is received at the primary control from a controller via a hoistway communication network to reposition the elevator car within the hoistway. The primary control commands the at least one drive via the local communication network to reposition the elevator car based on the command from the controller. The designation of the primary control transitions between the motion controls as the elevator car moves in the hoistway.

In the above embodiments, or in the alternative, the local communication network is a shorter distance network than the hoistway communication network.

In the above embodiments, or in the alternative, the primary control receives feedback as sensor data from one or more sensors, the sensor data received via one or more of: the local communication network, a wireless link of the elevator car, and a direct connection with one or more of the motion controls not presently designated as the primary control.

In the above embodiments, or in the alternative, the primary control sends information about motion of the elevator car to the controller via the hoistway communication network.

In the above embodiments, or in the alternative, the linear propulsion system includes a secondary portion mounted to the elevator car and a primary portion mounted in the hoistway, where the primary portion includes the motor segments.

In the above embodiments, or in the alternative, a bridge links the primary control to a plurality of drives coupled to a subset of the motor segments in the hoistway, and the bridge is coupled to the hoistway communication network.

In the above embodiments, or in the alternative, the primary control is located on one of: the drives, the bridge, or a location external to both of the drives and the bridge.

In the above embodiments, or in the alternative, the primary control is coupled to a plurality of neighboring drives via the local communication network, where the primary control is operable to command the neighboring drives.

In the above embodiments, or in the alternative, the neighboring drives each include an inverter operable to command current to one or more of the motor segments, and the primary control is operable to establish a velocity feedback control loop and a position feedback control loop relative to each of the inverters of the neighboring drives.

In the above embodiments, or in the alternative, the primary control passes internal state data of the velocity feedback control loop and the position feedback control loop on the local communication network as the designation of the primary control transitions between the motion controls.

In the above embodiments, or in the alternative, the local communication network links the motion controls on opposite sides of the hoistway.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

Figure 1:
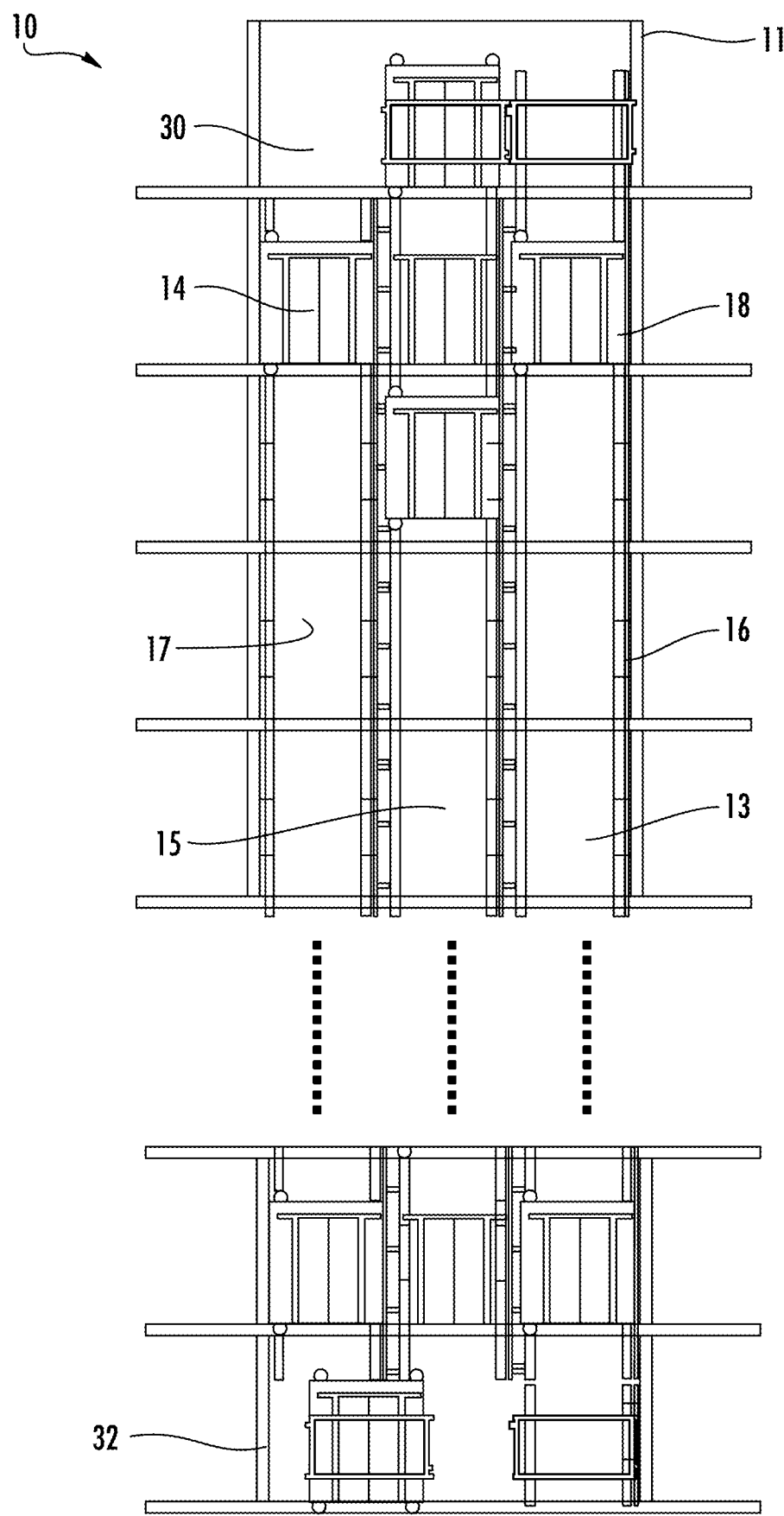
FIG. 1 depicts a multicar ropeless elevator system in accordance with an exemplary embodiment.

FIG. 1 depicts a multicar, self-propelled elevator system 10 in an exemplary embodiment. Elevator system 10 includes a hoistway 11 having a plurality of lanes 13, 15 and 17. While three lanes are shown in FIG. 1, it is understood that embodiments may be used with multicar, self-propelled elevator systems have any number of lanes. In each lane 13, 15, 17, cars 14 travel in one direction, i.e., up or down. For example, in FIG. 1 cars 14 in lanes 13 and 15 travel up and cars 14 in lane 17 travel down. One or more cars 14 may travel in a single lane 13, 15, and 17.

Above the top floor is an upper transfer station 30 to impart horizontal motion to elevator cars 14 to move elevator cars 14 between lanes 13, 15 and 17. It is understood that upper transfer station 30 may be located at the top floor, rather than above the top floor. Below the first floor is a lower transfer station 32 to impart horizontal motion to elevator cars 14 to move elevator cars 14 between lanes 13, 15 and 17. It is understood that lower transfer station 32 may be located at the first floor, rather than below the first floor. Although not shown in FIG. 1, one or more intermediate transfer stations may be used between the first floor and the top floor. Intermediate transfer stations are similar to the upper transfer station 30 and lower transfer station 32.

Cars 14 are propelled using a linear motor system having a primary, fixed portion 16 and a secondary, moving portion 18. The primary portion 16 includes windings or coils mounted at one or both sides of the lanes 13, 15 and 17. Secondary portion 18 includes permanent magnets mounted to one or both sides of cars 14. Primary portion 16 is supplied with drive signals to control movement of cars 14 in their respective lanes.

Figure 2:
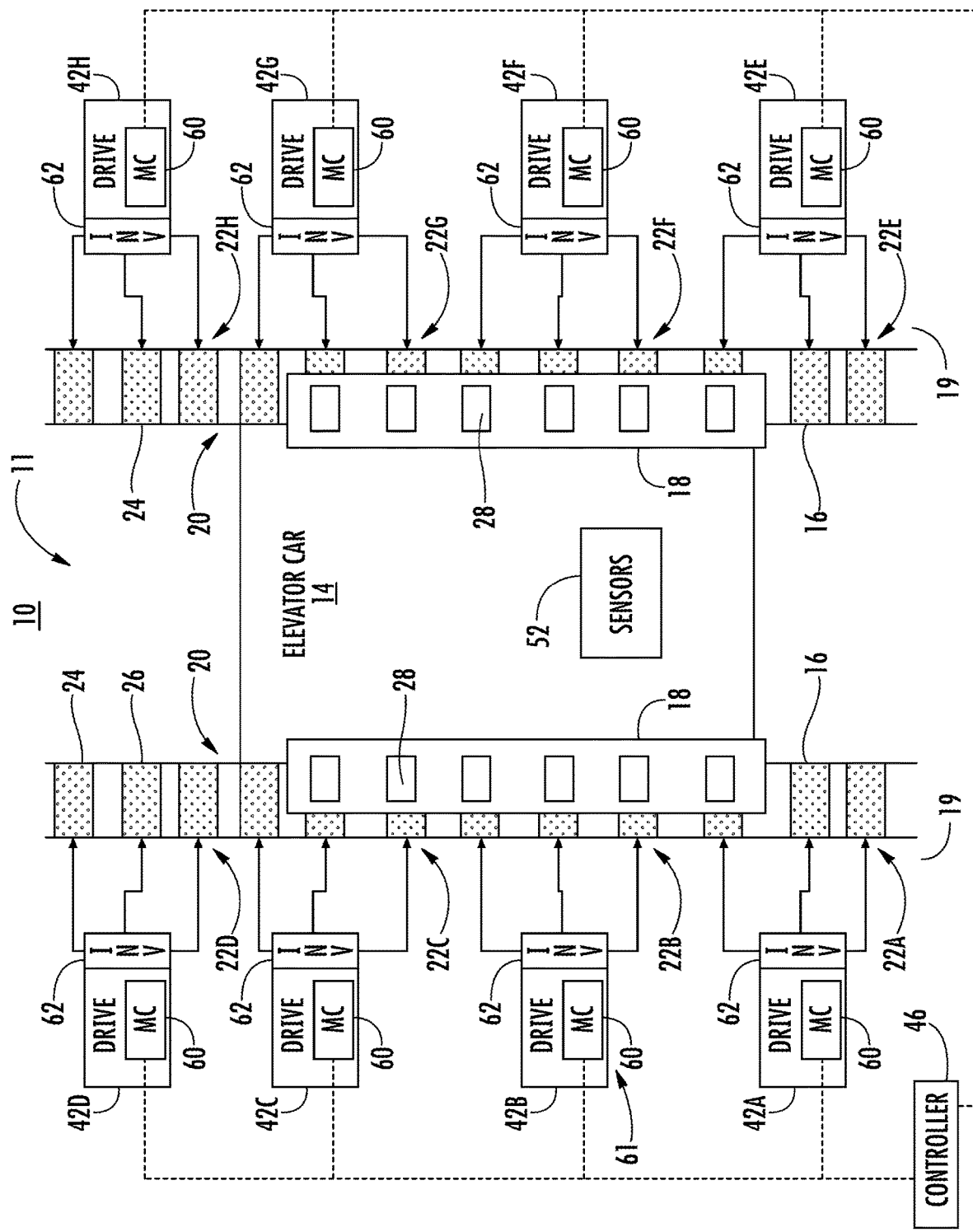
FIG. 2 depicts a portion of the elevator system in accordance with an exemplary embodiment.

FIG. 2 depicts another view of the elevator system 10 including an elevator car 14 that travels in hoistway 11. Elevator car 14 is guided by one or more guide rails 24 extending along the length of hoistway 11, where the guide rails 24 may be affixed to structural members 19. Elevator system 10 employs a linear propulsion system 20, where primary portion 16 includes multiple motor segments 22 each with one or more coils 26 (i.e., phase windings). Primary portion 16 may be mounted to one or more guide rails 24, incorporated into the guide rails 24, or may be located apart from guide rails 24. Primary portion 16 serves as a stator of a permanent magnet synchronous linear motor to impart force to elevator car 14. Secondary portion 18 is mounted to the elevator car 14 and includes an array of one or more permanent magnets 28 as a second portion of the linear propulsion system 20. Coils 26 of motor segments 22 may be arranged in three phases, six phases, or multiples thereof, as is known in the electric motor art. Each of the phases may have one or more coils 26, such as a pair of coils 26 per phase, where current can flow in opposite directions in each coil 26 when paired in a phase. The coils 26 may be formed about ferromagnetic cores, placed on a ferromagnetic support, or be coreless. Various coil configurations can be used to electrically connect the coils 26, such as a star configuration where coils 26 are in electrical series from a respective drive phase leg to a neutral point. One or more primary portions 16 may be mounted in the hoistway 11, to coact with permanent magnets 28 mounted to elevator car 14. The permanent magnets 28 may be positioned on two sides of elevator car 14. Alternate embodiments may use a single primary portion 16—secondary portion 18 configuration, or multiple primary portion 16—secondary portion 18 configurations.

In the example of FIG. 2, there are eight motor segments 22 depicted as motor segments 22A, 22B, 22C, 22D, 22E, 22F, 22G, and 22H. Each of the motor segments 22A-22H has a corresponding drive 42A-42H. In an embodiment, higher-level control within the hoistway 11 can be commanded and monitored by controller 46, where the controller 46 can communicate with one or more motion controls 60. Commands from the controller 46 are with respect to elevator car 14 positioning within the hoistway 11, e.g., movement between floors of a building. Therefore, the controller 46 can command movement of the elevator car 14 upward or downward in the hoistway 11, e.g., to a different floor of a building, and the motion controls 60 implement lower-level (i.e., motor level) control to energize portions of the linear propulsion system 20 to realize the commanded movement. The one or more motion controls 60 convert commands from the controller 46 into motor-level commands to drive the motor segments 22. The one or more motion controls 60 provide drive signals to the motor segments 22A-22H via drives 42A-42H to control motion of the elevator car 14. Each of the drives 42A-42H can include an inverter 62 that commands current to one or more of the motor segments 22. Each of the drives 42A-42H can include a separate instance of the motion control 60, where each motion control 60 is operable to command at least one of the drives 42A-42H coupled to motor segments 22A-22H.

To efficiently coordinate control as the elevator car 14 is repositioned within hoistway 11, a motion control 60 proximate to the elevator car 14 can be designated as a primary control 61 to issue commands to neighboring drives 42. For example, motion control 60 of drive 42B in FIG. 2 can be designated as primary control 61, whereby the primary control 61 issues commands locally to drives 42A-42C and drives 42E-42G (i.e., neighboring drives). As the elevator car 14 moves within the hoistway 11, for instance in an upward direction, the designation of the primary control 61 transitions between the motion controls 60. For example, when motor segments 22A and 22E no longer provide thrust as the elevator car 14 advances to at least partially overlap motor segments 22D and 22H, the motion control 60 of drives 42C or 42G can be designated as the primary control 61 to issue commands to drives 42B-42D and drives 42F-42H. The elevator car 14 may include one or more sensors 52, such as position and velocity sensors, to wirelessly provide sensor data from the elevator car 14 to one or more of the drives 42 via one or more wireless link.

The primary control 61 can control drives 42 on opposite sides of the hoistway 11. In an alternate embodiment, one of the motion controls 60 on each side of the hoistway 11 is designated as primary control 61 with respect to the elevator car 14. Regardless of whether a single motion control 60 or multiple motion controls 60 are designated as primary control 61, the designation of the primary control 61 changes as the elevator car 14 moves up or down in the hoistway 11 such that the primary control 61 remains in close physical proximity to the elevator car 14. Keeping the primary control 61 in close physical proximity to the elevator car 14 ensures substantially consistent latency between the primary control 61 and the drives 42 that are actively imparting motion to the elevator car 14.

Each motion control 60 may be implemented using a microprocessor executing a computer program stored on a storage medium to perform the operations described herein. Alternatively, one or more of the motion controls 60 may be implemented in hardware (e.g., ASIC, FPGA) or in a combination of hardware/software. Although a single motion control 60 may be provided to control the operation of each drive 42, in alternate embodiments, the motion control 60 can be located external to the drives 42 and may have a one-to-many relationship with respect to the drives 42 rather than the one-to-one relationship as depicted in FIG. 2. To achieve a higher communication bandwidth, the communication range of each motion control 60 can be relatively short to interface with a local neighborhood of drives 42 rather than all drives 42 of the hoistway 11.

Figure 3:
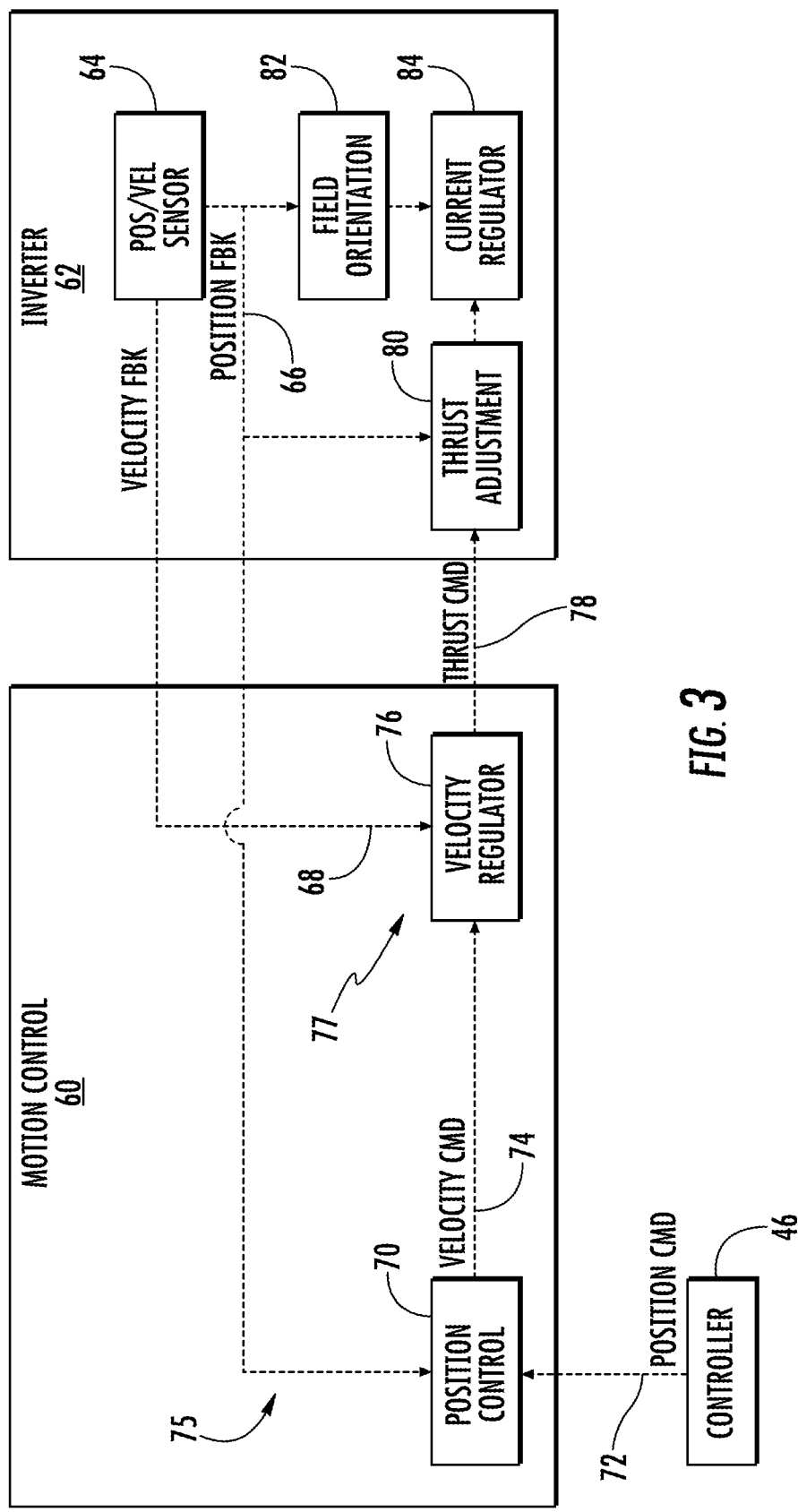
FIG. 3 depicts a control block diagram of a portion of an elevator system in accordance with an exemplary embodiment.

FIG. 3 depicts a control block diagram of a portion of elevator system 10 in accordance with an exemplary embodiment. In the example of FIG. 3, rather than receive position and velocity data from the elevator car 14, the inverter 62 may include a position/velocity sensor 64 that provides position feedback 66 and velocity feedback 68 to the motion control 60. In an alternate embodiment, the position/velocity sensor 64 is a virtual sensor that provides the position feedback 66 and velocity feedback 68 based on values received, for example, from the sensors 52 of FIG. 2. As a further alternative, the position/velocity sensor 64 can be directly connected to the motion control 60. A position control 70 of the motion control 60 may receive a position command 72 from controller 46 and the position feedback 66 from the inverter 62. In an embodiment, the position command 72 is sent on a hoistway communication network as a lower-bandwidth network over a longer distance, while the position feedback 66 and velocity feedback 68 are sent on a local communication network as a higher-bandwidth network over a shorter distance as compared to the hoistway communication network.

The position control 70 can apply a conventional proportional-integral (PID) control to generate a velocity command 74 based on the position command 72 and the position feedback 66 as part of a position feedback control loop 75. A velocity regulator 76 of the motion control 60 receives the velocity command 74 and the velocity feedback 68 and generates a thrust command 78 as part of a velocity feedback control loop 77. The thrust command 78 may be generated using a conventional PID control for linear motors. Thrust adjustment 80 of the inverter 62 can augment the thrust command 78 based on the position feedback 66. Field orientation 82 is also performed with respect to the position feedback 66. The thrust adjustment 80 and field orientation 82 provide input to a current regulator 84 that can command current to one or more motor segments 22 of FIG. 2.

While only a single inverter 62 is depicted in FIG. 3, motion control 60 can simultaneously control multiple inverters 62 of the drives 42 of FIG. 2, for instance, six or more inverters 62 may be simultaneously controlled by a single motion control 60. Thus, each instance of motion control 60 designated as the primary control 61 of FIG. 2 is operable to establish a velocity feedback control loop 77 and a position feedback control loop 75 relative to each of the inverters 62 of the neighboring drives 42, as well as a local drive 42 in which the primary control 61 may reside.

Figure 4:
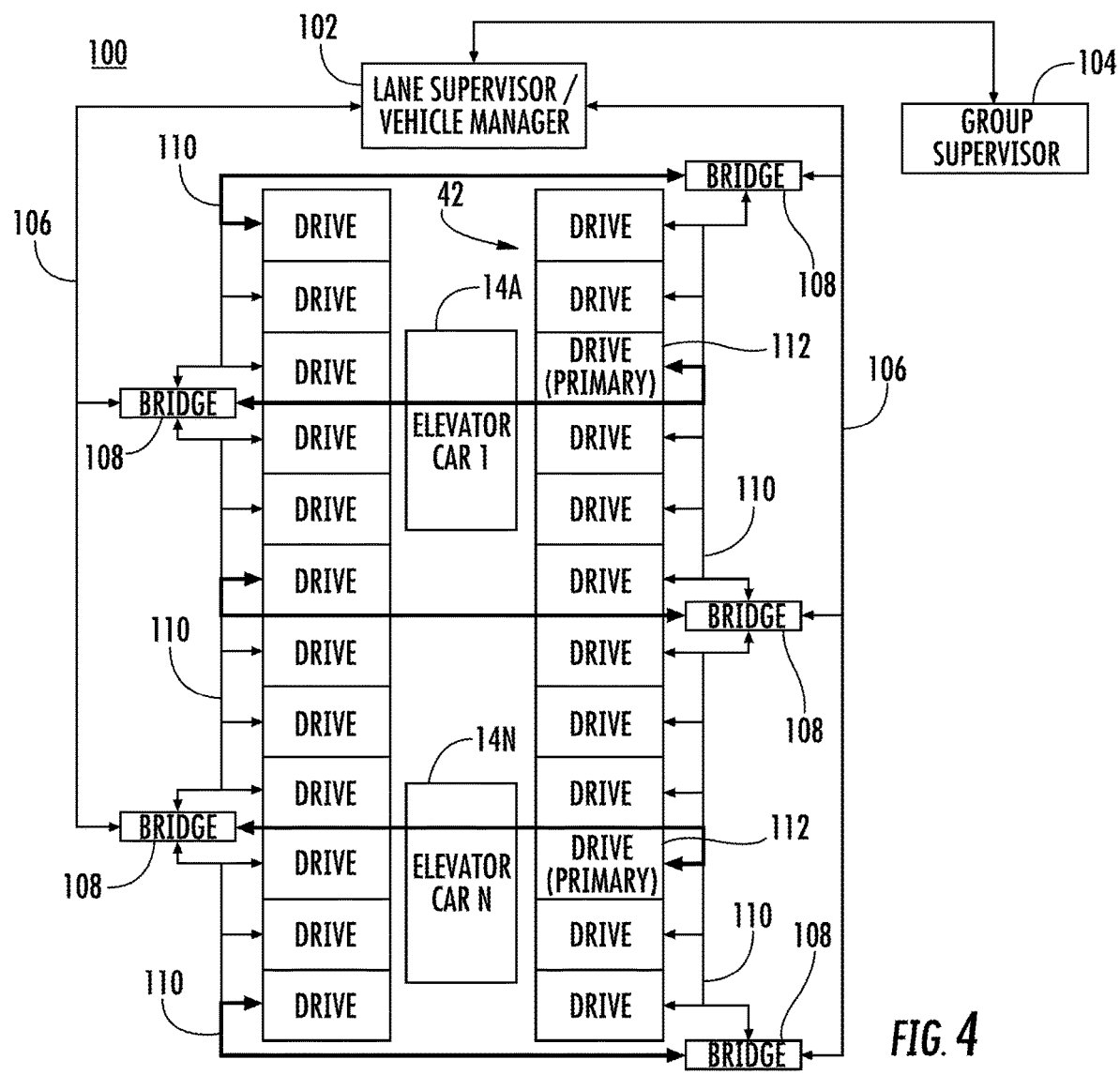
FIG. 4 depicts a portion of a control network of an elevator system in accordance with an exemplary embodiment.

FIG. 4 depicts a portion of a control network 100 of elevator system 10 in accordance with an exemplary embodiment. In the example of FIG. 4, a lane supervisor/vehicle manager 102 can include the functionality of the controller 46 of FIG. 2 to command movement of a plurality of elevator cars 14A-14N. A group supervisor 104 can interact with the lane supervisor/vehicle manager 102 and other instances of the lane supervisor/vehicle manager 102 (not depicted) for other lanes (FIG. 1). A hoistway communication network 106 enables communication between the lane supervisor/vehicle manager 102 and one or more bridges 108. The bridges 108 can also communicate with one or more local communication networks 110 coupled to drives 42. In an embodiment, the local communication network 110 is a higher bandwidth and shorter distance network than the hoistway communication network 106. The motion controls 60 of FIG. 2 can be located on the drives 42, on the bridges 108, or at locations external to the drives 42 and bridges 108. Each bridge 108 can link a motion control 60 of FIG. 2 to a plurality of drives 42 coupled to a subset of the motor segments 22 in the hoistway 11 of FIG. 2. Motion controls 60 of FIG. 2 can send information about motion of the elevator cars 14A-14N to the lane supervisor/vehicle manager 102 via the hoistway communication network 106.

When the motion controls 60 of FIG. 2 are located in the drives 42, a drive 42 that includes the primary control 61 of FIG. 2 can be designated as a primary drive 112. The primary drive 112 can exchange commands and data with neighboring drives 42 via the local communication network 110. Each primary drive 112 can control neighboring drives 42 that fully and partially overlap with the position of each elevator car 14A-14N. There can be one primary drive 112 designated per elevator car 14A-14N, where the local communication network 110 links the motion controls and drives 42 on opposite sides of the hoistway such that a single instance of the primary drive 112 can control drives 42 on opposite sides of the hoistway. In an alternate embodiment, each side of the hoistway has a separate primary drive 112 per elevator car 14A-14N that is paired across the hoistway and transitions between drives 42 as the elevator car 14A-14N move.

Figure 5:
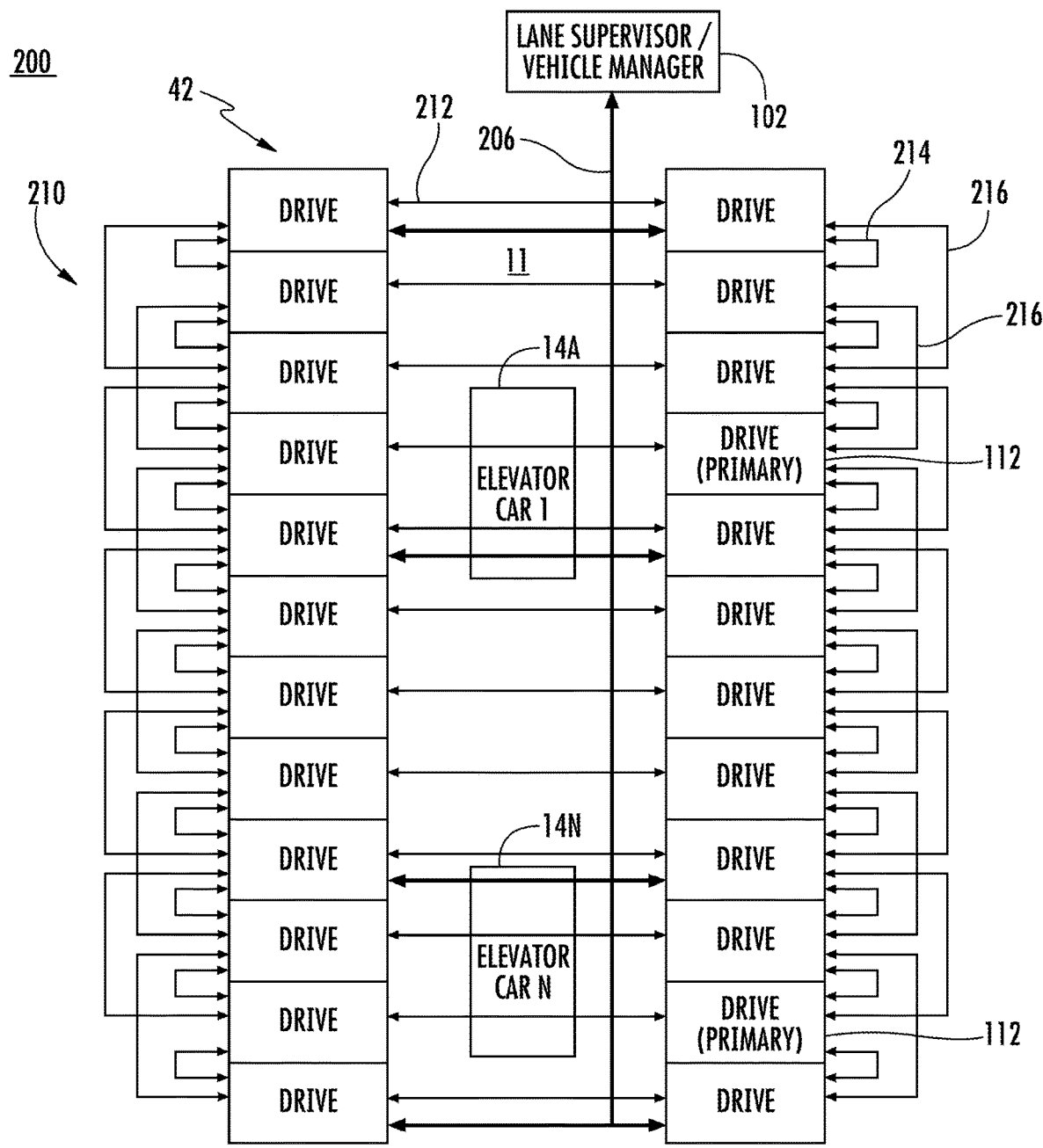
FIG. 5 depicts a portion of an alternate control network of an elevator system in accordance with an exemplary embodiment.

FIG. 5 depicts a portion of an alternate control network 200 of elevator system 10 in accordance with an exemplary embodiment. In the example of FIG. 5, a hoistway communication network 206 enables communication between the lane supervisor/vehicle manager 102 and the drives 42 absent the bridges 108 of FIG. 5. The drives 42 can communicate with each other via a local communication network 210. In the example of FIG. 5, the local communication network 210 includes a number of point-to-point links. A cross-hoistway link 212 may link drives 42 across the hoistway 11. A one-hop neighbor link 214 can link adjacent drives 42. A two-hop neighbor link 216 may link drives 42 offset by two positions such that one drive 42 is skipped between a pair of drives 42. Additional links may also be included (not depicted). Thus, a primary drive 112 may communicate with neighbor drives 42 using a combination of one or more of the cross-hoistway link 212, one-hop neighbor link 214, and two-hop neighbor link 216 of the local communication network 210. Further, the hoistway communication network 206 need not link to all of the drives 42, as commands from the lane supervisor/vehicle manager 102 may be relayed between drives 42 using the cross-hoistway link 212 and/or neighbor links 214, 216. As a further option, one or more bridges 108 of FIG. 4 can incorporated in the control network 200, for instance, as part of the hoistway communication network 206.

Figure 7:
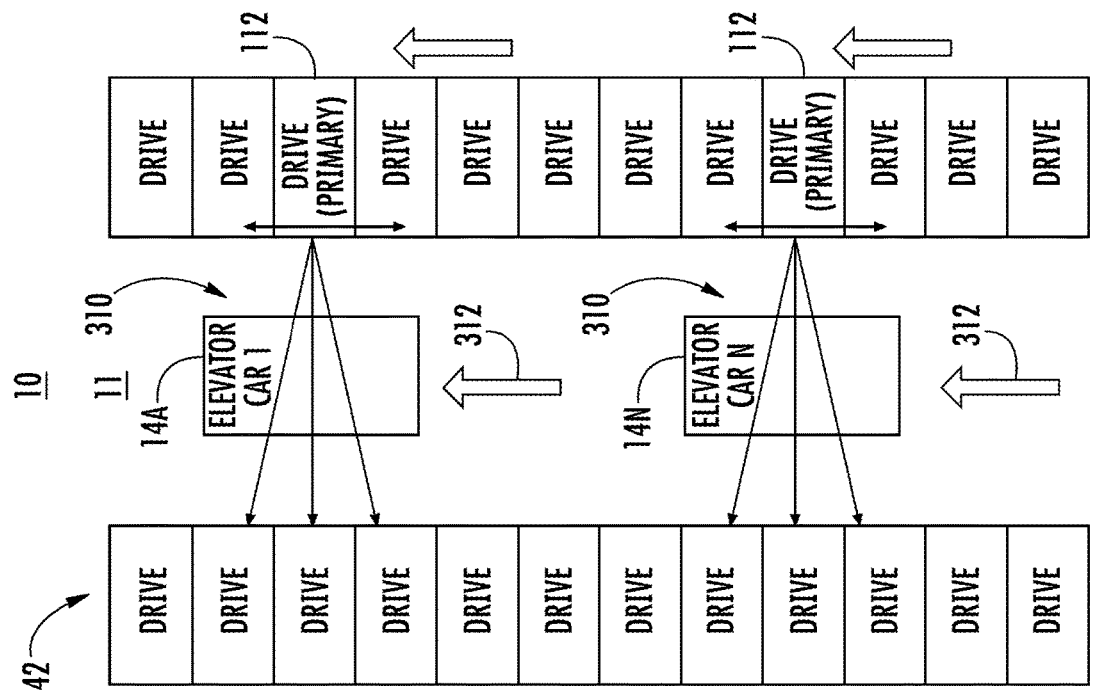
FIG. 7 depicts a change in primary drive designation as an elevator car advances relative to FIG. 6 in accordance with an exemplary embodiment.
Figure 6:
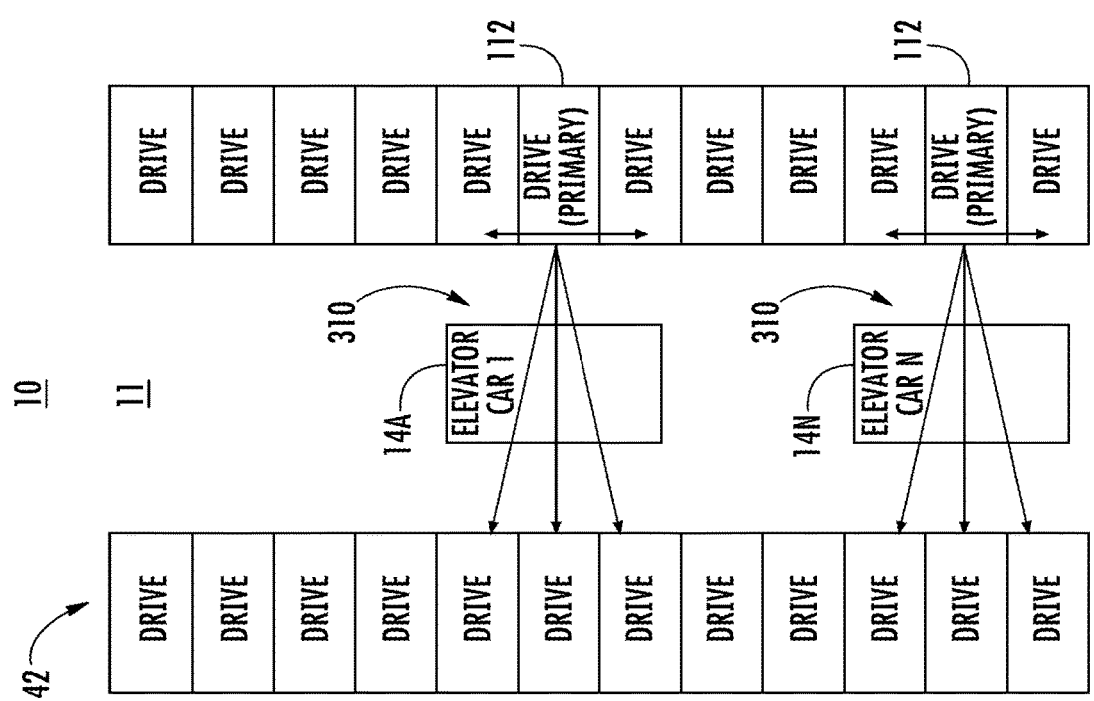
FIG. 6 depicts primary drives in communication with neighboring drives of a control network of an elevator system in accordance with an exemplary embodiment.

FIG. 6 depicts primary drives 112 in communication with neighboring drives 42 of a control network of elevator system 10 in accordance with an exemplary embodiment. A local communication network 310 enables local communication between multiple drives 42. One of the drives 42 coupled to motor segments 22 of FIG. 2 is assigned as primary drive 112 to control imparting force to elevator car 14 in hoistway 11. An internal state of the primary drive 112 can be communicated to another one of the drives 42 based on determining that the elevator car 14 has transitioned to a new position 312 in the hoistway 11 as depicted in FIG. 7. The internal state can be communicated on the local communication network 310. A motion control 60 (FIG. 2) of the primary drive 112 can interface with a controller 46 (FIG. 2) via a hoistway communication network (such as hoistway communication network 206 of FIG. 5) to reposition the elevator car 14 in the hoistway 11. As each elevator car 14 moves in the hoistway 11, motion control 60 of FIG. 2 moves as well such that the primary control 61 of FIG. 2 and primary drive 112 designations transition between motion controls 60 and drives 42 respectively. Internal state data passed on the local communication network 310 can include state variables of the velocity feedback control loop 77 and position feedback control loop 75 of FIG. 3 in order to maintain smooth motion characteristics as elevator car 14 moves.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. An elevator system comprising:
   an elevator car;
   a linear propulsion system to impart force to the elevator car in a hoistway;
   a hoistway communication network;
   a local communication network;
   a plurality of motion controls, wherein one of the motion controls proximate to the elevator car is designated as a primary control operable to command at least one drive via the local communication network, the at least one drive coupled to one or more motor segments of the linear propulsion system; and
   a controller operable to command the primary control via the hoistway communication network to reposition the elevator car within the hoistway, wherein the designation of the primary control transitions between the motion controls as the elevator car moves in the hoistway.

2. The elevator system of claim 1, wherein the local communication network is a shorter distance network than the hoistway communication network, and the primary control sends information about motion of the elevator car to the controller via the hoistway communication network.

3. The elevator system of claim 1, wherein the primary control receives feedback as sensor data from one or more sensors, the sensor data received via one or more of: the local communication network, a wireless link of the elevator car, and a direct connection with one or more of the motion controls not presently designated as the primary control.

4. The elevator system of claim 1, wherein the linear propulsion system comprises: a secondary portion mounted to the elevator car and a primary portion mounted in the hoistway, the primary portion comprising the motor segments.

5. The elevator system of claim 1, wherein a bridge links the primary control to a plurality of drives coupled to a subset of the motor segments in the hoistway, and the bridge is coupled to the hoistway communication network.

6. The elevator system of claim 5, wherein the primary control is located on one of: the drives, the bridge, or a location external to both of the drives and the bridge.

7. The elevator system of claim 1, wherein the primary control is coupled to a plurality of neighboring drives via the local communication network, the primary control operable to command the neighboring drives.

8. The elevator system of claim 7, wherein the neighboring drives each comprises an inverter operable to command current to one or more of the motor segments, and the primary control is operable to establish a velocity feedback control loop and a position feedback control loop relative to each of the inverters of the neighboring drives.

9. The elevator system of claim 8, wherein the primary control passes internal state data of the velocity feedback control loop and the position feedback control loop on the local communication network as the designation of the primary control transitions between the motion controls.

10. The elevator system of claim 1, wherein the local communication network links the motion controls on opposite sides of the hoistway.

11. A method comprising:
    designating one of a plurality of motion controls proximate to an elevator car as a primary control operable to command at least one drive via a local communication network, the at least one drive coupled to one or more motor segments of a linear propulsion system operable to impart force to an elevator car in a hoistway;
    receiving a command at the primary control from a controller via a hoistway communication network to reposition the elevator car within the hoistway;
    commanding, by the primary control, the at least one drive via the local communication network to reposition the elevator car based on the command from the controller; and
    transitioning the designation of the primary control between the motion controls as the elevator car moves in the hoistway.

12. The method of claim 11, wherein the local communication network is a shorter distance network than the hoistway communication network.

13. The method of claim 11, wherein the primary control receives feedback as sensor data from one or more sensors, the sensor data received via one or more of: the local communication network, a wireless link of the elevator car, and a direct connection with one or more of the motion controls not presently designated as the primary control.

14. The method of claim 11, wherein the primary control sends information about motion of the elevator car to the controller via the hoistway communication network.

15. The method of claim 11, wherein a bridge links the primary control to a plurality of drives coupled to a subset of the motor segments in the hoistway, and the bridge is coupled to the hoistway communication network.

16. The method of claim 15, wherein the primary control is located on one of: the drives, the bridge, or a location external to both of the drives and the bridge.

17. The method of claim 11, wherein the primary control is coupled to a plurality of neighboring drives via the local communication network, the primary control operable to command the neighboring drives.

18. The method of claim 17, wherein the neighboring drives each comprises an inverter operable to command current to one or more of the motor segments, and the primary control is operable to establish a velocity feedback control loop and a position feedback control loop relative to each of the inverters of the neighboring drives.

19. The method of claim 18, wherein the primary control passes internal state data of the velocity feedback control loop and the position feedback control loop on the local communication network as the designation of the primary control transitions between the motion controls.

20. The method of claim 11, wherein the local communication network links the motion controls on opposite sides of the hoistway.

* * * * *